US012574483B2

(12) United States Patent
Mizuno

(10) Patent No.: US 12,574,483 B2
(45) Date of Patent: Mar. 10, 2026

(54) OPTICAL APPARATUS AND THREE-DIMENSIONAL MODELING APPARATUS

(71) Applicant: SCREEN HOLDINGS CO., LTD., Kyoto (JP)

(72) Inventor: Hirofumi Mizuno, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 413 days.

(21) Appl. No.: 18/362,185

(22) Filed: Jul. 31, 2023

(65) Prior Publication Data

US 2024/0064275 A1 Feb. 22, 2024

(30) Foreign Application Priority Data

Aug. 17, 2022 (JP) ................................. 2022-129836

(51) Int. Cl.
*H04N 9/31* (2006.01)
(52) U.S. Cl.
CPC ......... *H04N 9/3152* (2013.01); *H04N 9/3102* (2013.01); *H04N 9/3129* (2013.01); *H04N 9/317* (2013.01); *H04N 9/3197* (2013.01)
(58) Field of Classification Search
CPC ...... H04N 9/315; H04N 9/317; H04N 9/3102; H04N 9/3129; H04N 9/3152; H04N 9/3197; B29C 64/153; B29C 64/268; B29C 64/286; B22F 12/22; B22F 12/40; B22F 12/44; B22F 12/49
See application file for complete search history.

(56) References Cited

U.S. PATENT DOCUMENTS

| | | | | |
|---|---|---|---|---|
| 2014/0307245 A1* | 10/2014 | Tanaka | ................ | G03F 7/70566 355/71 |
| 2016/0037142 A1* | 2/2016 | Nakajima | .............. | G02B 27/48 353/38 |
| 2020/0112137 A1* | 4/2020 | Arakawa | ............ | G02B 27/0927 |
| 2021/0313492 A1 | 10/2021 | Mizuno et al. | | |

FOREIGN PATENT DOCUMENTS

JP 2021-165769 A 10/2021

* cited by examiner

*Primary Examiner* — Sultan Chowdhury
(74) *Attorney, Agent, or Firm* — Rimon P.C.

(57) ABSTRACT

An illumination optical system is configured to convert an intensity distribution of incident light in a long axis direction from a Gaussian distribution, to thereby bring an intensity distribution of a shaped beam on a modulation surface of an optical modulator in the long axis direction into a top hat distribution, and to guide the incident light to the optical modulator as parallel light in the long axis direction and as convergent light in the short axis direction. A short axis side light shielding part is disposed at a condensing position on a short axis side of a modulated beam which is emitted from the optical modulator and is convergent light on a short axis side and blocks a non-zero-order diffracted beam on the short axis side of the modulated beam.

10 Claims, 6 Drawing Sheets

OPTICAL APPARATUS AND THREE-DIMENSIONAL MODELING APPARATUS

CROSS REFERENCE TO RELATED APPLICATION

The present application claims the benefit of priority to Japanese Patent Application No. 2022-129836 filed on Aug. 17, 2022, the content of which is incorporated herein by reference in its entirety.

TECHNICAL FIELD

The present invention relates to an optical apparatus which emits a modulated beam onto a target object, and a three-dimensional modeling apparatus which includes the optical apparatus.

BACKGROUND ART

In recent years, an SLS (Selective Laser Sintering) type three-dimensional modeling apparatus has been used, which emits a modulated laser beam to a modeling material such as metal powder, resin powder, or the like and sinters the modeling material, to thereby perform three-dimensional modeling. In the three-dimensional modeling apparatus, an increase in the productivity is required, and as a method therefor, it is considered, for example, to make it possible to emit a plurality of spots at a time by forming a linear pattern light by using an optical modulator. At that time, in the optical modulator for forming the pattern light, in order to ensure the power density (i.e., the light intensity per unit area) of the laser beam to be emitted to the modeling material, light having high power density is sometimes emitted. At that time, when the laser beam having an intensity distribution which is a Gaussian distribution is emitted to the optical modulator, the peak intensity (i.e., maximum intensity) on a modulation surface of the optical modulator becomes too high, and there arises a possibility that the optical modulator may be damaged.

Then, in a three-dimensional modeling apparatus disclosed in Japanese Patent Application Laid Open Gazette No. 2021-165769 (Document 1), it is suggested to increase the amount of light to be inputted to an optical modulator without damaging the optical modulator by shaping the intensity distribution of a laser beam incident onto the optical modulator to be flat by using a top-hat beam shaper.

In the three-dimensional modeling apparatus of Document 1, in a projection optical system for guiding the laser beam modulated by the optical modulator to a target object, provided are a relatively large number of optical elements. In the projection optical system, for example, in order to block a non-zero-order diffracted beam among the laser beam modulated by the optical modulator and guide only a zero-order beam to a modeling material, a cylindrical lens is provided at a position adjacent to the optical modulator, and a light shielding part is provided at a condensing position of the cylindrical lens.

On the other hand, in such a high-power three-dimensional modeling apparatus, in order to more accurately condense the modulated laser beam onto the modeling material, it is necessary to increase the performance and the placement accuracy of the optical elements such as lenses or the like constituting the projection optical system. For this reason, it is required to simplify the structure of the projection optical system, such as reducing the number of optical elements constituting the projection optical system, or the like. Further, simplification of the structure of the projection optical system and an increase in the amount of light to be inputted to the optical modulator are also required in an optical apparatus provided in any apparatus (for example, a laser marking apparatus) other than the three-dimensional modeling apparatus.

SUMMARY OF THE INVENTION

The present invention is intended for an optical apparatus for emitting a modulated beam onto a target object, and it is an object of the present invention to increase the amount of light to be inputted to an optical modulator while simplifying a structure of a projection optical system.

The optical apparatus according to one preferred embodiment of the present invention includes an illumination optical system for shaping a laser beam into a shaped beam which is long in a long axis direction, an optical modulator for modulating the shaped beam into a modulated beam, and a projection optical system for guiding the modulated beam onto an irradiated surface of a target object. The illumination optical system includes a beam shaper and an illumination optical element. The illumination optical system is configured to convert an intensity distribution of incident light in the long axis direction from a Gaussian distribution, to thereby bring an intensity distribution of the shaped beam on a modulation surface of the optical modulator in the long axis direction into a top hat distribution, and to guide the incident light to the optical modulator as parallel light in the long axis direction and as convergent light in the short axis direction. The optical modulator includes a plurality of modulation elements which are two-dimensionally arranged, and performs modulation in the long axis direction and dose not perform modulation in the short axis direction. The projection optical system includes a short axis side light shielding part disposed at a condensing position on a short axis side of the modulated beam which is emitted from the optical modulator and is convergent light on a short axis side, for blocking a non-zero-order diffracted beam on the short axis side of the modulated beam, a first projection optical element for converging the modulated beam passing through the short axis side light shielding part in the long axis direction, a long axis side light shielding part disposed at a condensing position on a long axis side of the modulated beam from the first projection optical element, for blocking a non-zero-order diffracted beam on the long axis side of the modulated beam, and a second projection optical element for converging the modulated beam passing through the long axis side light shielding part in the short axis direction and condensing the modulated beam on the irradiated surface. The modulation surface and the irradiated surface are optically conjugated with respect to the long axis direction by the projection optical system.

According to the above-described optical apparatus, it is possible to increase the amount of light to be inputted to the optical modulator while simplifying a structure of the projection optical system.

Preferably, the projection optical system further includes a third projection optical element positioned between the short axis side light shielding part and the first projection optical element. The modulated beam passing through the short axis side light shielding part is made parallel light in the short axis direction by the third projection optical element and the first projection optical element. The first projection optical element has the same focus position both in the short axis direction and in the long axis direction. The short axis side light shielding part and the irradiated surface are optically conjugated with respect to the short axis direction by the projection optical system.

Preferably, the illumination optical system converts an intensity distribution of the laser beam in the short axis direction from a Gaussian distribution, to thereby also bring an intensity distribution of the shaped beam on the modulation surface in the short axis direction into a top hat distribution.

Preferably, the illumination optical element is one lens, and no optical element other than the one lens is disposed between the beam shaper and the optical modulator in the illumination optical system.

Preferably, the modulated beam emitted from the optical modulator is directly incident onto the short axis side light shielding part without going through any other optical element.

Preferably, the optical modulator is a PLV (Planar Light Valve).

Preferably, the beam shaper is one optical element for spreading incident light at respective different divergence angles in the long axis direction and the short axis direction.

Preferably, the shaped beam outgoing from the illumination optical system is diagonally incident onto the modulation surface at a predetermined incident angle, and the modulated beam reflected by the modulation surface while being modulated is incident onto the projection optical system.

The present invention is also intended for a three-dimensional modeling apparatus. The three-dimensional modeling apparatus according to one preferred embodiment of the present invention includes the above-described optical apparatus, a laser light source for emitting the laser beam to the optical apparatus, and a scanning part which is the target object irradiated with the modulated beam from the optical apparatus and scans the modulated beam on a modeling material.

Preferably, the scanning part includes a galvanometer mirror which rotates to change a traveling direction of the modulated beam.

These and other objects, features, aspects and advantages of the present invention will become more apparent from the following detailed description of the present invention when taken in conjunction with the accompanying drawings.

DETAILED DESCRIPTION

Figure 1:
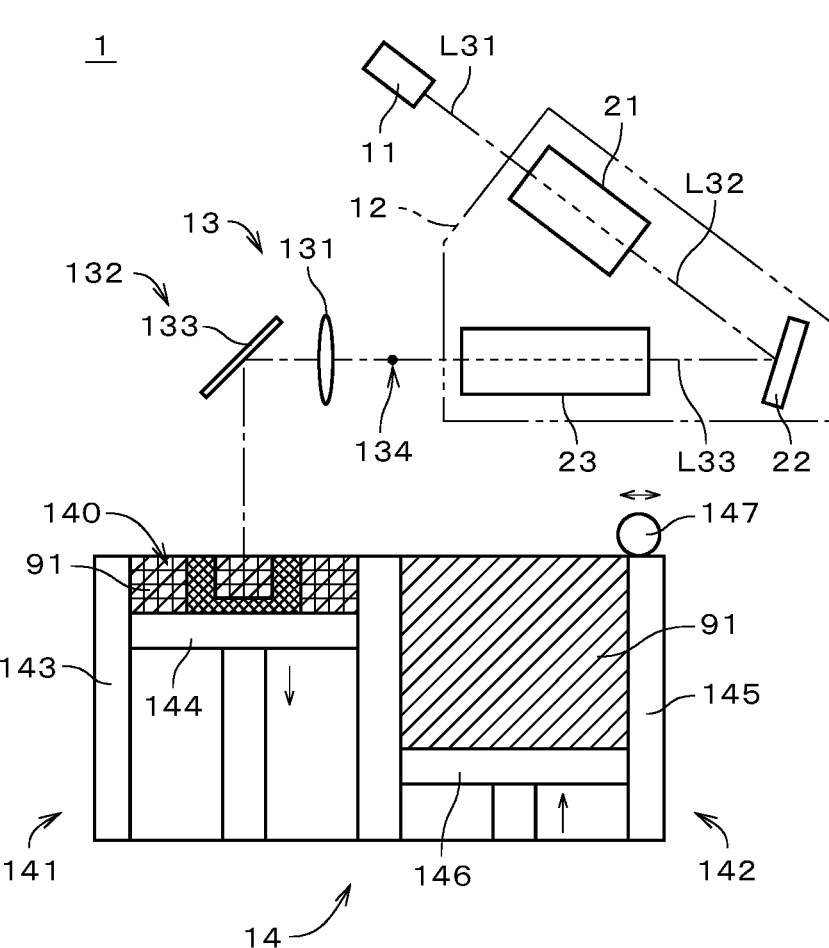
FIG. 1 is a view showing a configuration of a three-dimensional modeling apparatus in accordance with one preferred embodiment.

FIG. 1 is a view showing a configuration of a three-dimensional modeling apparatus 1 in accordance with one preferred embodiment of the present invention. The three-dimensional modeling apparatus 1 is an SLS (Selective Laser Sintering) type three-dimensional modeling apparatus which emits a modulated laser beam to a powdery or pasty modeling material and sinters or melts the modeling material, to thereby perform three-dimensional modeling. The modeling material is, for example, a metal, engineering plastics, ceramics, a synthetic resin, or the like. The modeling material may contain a plurality of kinds of materials.

The three-dimensional modeling apparatus 1 includes a laser light source 11, an optical apparatus 12, a scanning part 13, and a material feeding mechanism 14. FIG. 1 shows a longitudinal section of the material feeding mechanism 14. In the three-dimensional modeling apparatus 1, a laser beam L31 emitted from the laser light source 11 is guided to the scanning part 13 by the optical apparatus 12 and scanned on a modeling material 91 inside a modeling space 140 of the material feeding mechanism 14 by the scanning part 13. A portion of the modeling material 91 which is irradiated with the laser beam is sintered. Then, by repeating the feed of the modeling material 91 into the modeling space 140 and the scan of the laser beam on the modeling material 91, a three-dimensional model is formed. In FIG. 1, for easy understanding of this figure, constituent elements of the optical apparatus 12 are surrounded by a two-dot chain line.

In the three-dimensional modeling apparatus 1, the constituent elements such as the laser light source 11, the optical apparatus 12, the scanning part 13, the material feeding mechanism 14, and the like are controlled by a not-shown control part on the basis of design data (e.g., CAD data) or the like of a three-dimensional model to be produced. The control part is, for example, an ordinary computer including a processor, a memory, an input/output part, and a bus. Further, the constituent elements of the control part may be changed in various ways.

The laser light source 11 emits the laser beam L31 to the optical apparatus 12. The laser light source 11 is, for example, a fiber laser light source. The wavelength of the laser beam L31 is, for example, 1.070 µm. Further, the type of the laser light source 11 and the wavelength of the laser beam L31 may be changed in various ways.

The optical apparatus 12 modulates the laser beam L31 from the laser light source 11 into a modulated beam L33 and emits the modulated beam L33 to the scanning part 13. The optical apparatus 12 includes an illumination optical system 21, an optical modulator 22, and a projection optical system 23. The illumination optical system 21 and the projection optical system 23 each include a plurality of optical elements such as lenses or the like, as described later.

The illumination optical system 21 shapes the laser beam L31 from the laser light source 11 into a shaped beam L32 having a substantially rectangular shape which is long in one direction (hereinafter, referred to as a "long axis direction") and guides the shaped beam L32 to the optical modulator 22. In other words, the cross-sectional shape of the shaped beam L32 is a substantially rectangular shape which is long in the long axis direction and short in a short axis direction perpendicular to the long axis direction. The long axis direction and the short axis direction are directions perpendicular to a traveling direction (i.e., an optical axis direction) of the shaped beam L32. Further, the cross-sectional shape of the shaped beam L32 is the shape of the shaped beam L32 on a plane perpendicular to the traveling direction of the shaped beam L32. In the following description, the cross section of light refers to a cross section of the light on a plane perpendicular to the traveling direction of the light, like the above-described one. The cross-sectional shape of the shaped beam L32 can be regarded to be a substantially straight linear shape extending in the long axis direction. The shape of an irradiation region of the shaped beam L32 on the optical modulator 22 is, for example, a substantially rectangular shape having a length of about 27 mm in the long axis direction and a length of about 1 mm in the short axis direction.

The optical modulator 22 modulates the shaped beam L32 from the illumination optical system 21 into the modulated beam L33 and guides the modulated beam L33 to the projection optical system 23. As the optical modulator 22, for example, an LPLV (Liner Planar Light Valve) which is a kind of a PLV (Planar Light Valve) is used.

Figure 2:
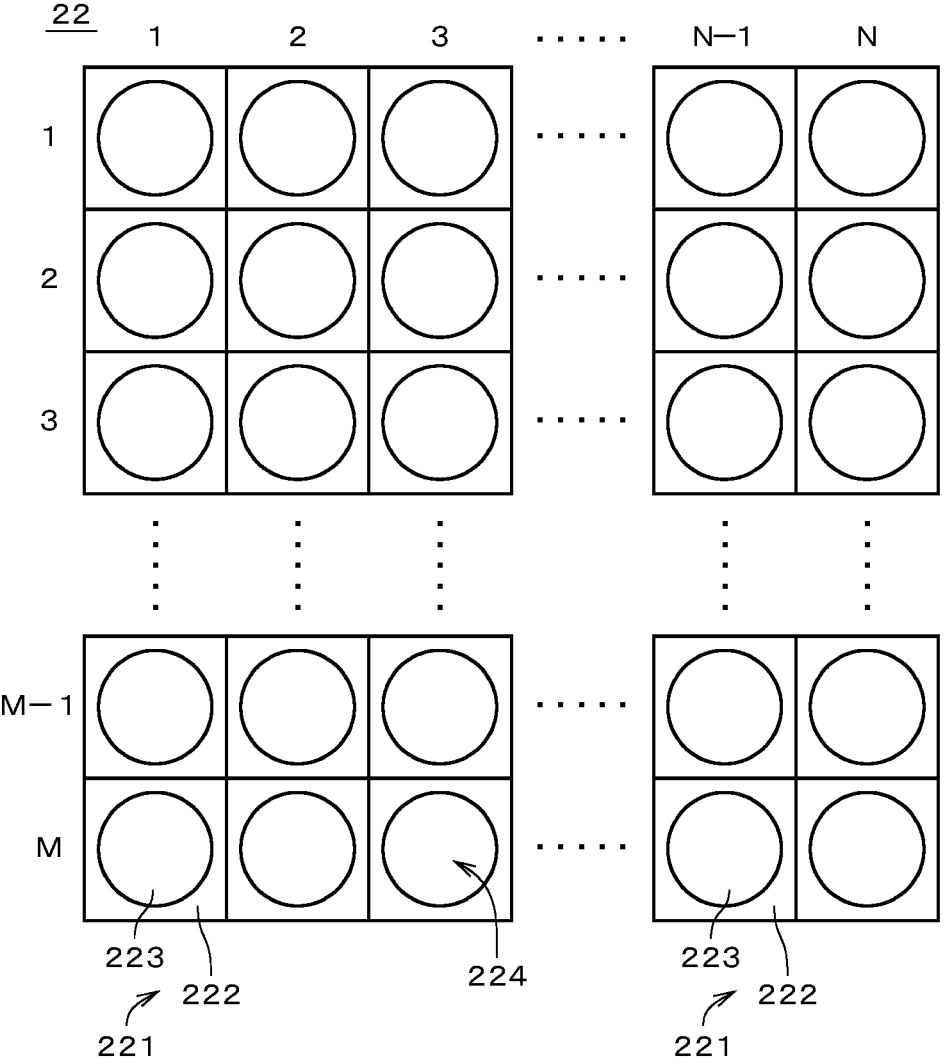
FIG. 2 is a view showing an optical modulator.

FIG. 2 is a view showing a simplified structure of the optical modulator 22 (i.e., the LPLV). The optical modulator 22 includes a plurality of substantially rectangular pixels 221 which are arranged adjacently in a matrix (i.e., two-dimensionally arranged) on a not-shown substrate. In the optical modulator 22, a surface of the plurality of pixels 221 serves as a modulation surface 224. In the exemplary case shown in FIG. 2, arranged are M pixels 221 in a vertical direction and N pixels 221 in a horizontal direction of this figure. The horizontal direction in FIG. 2 corresponds to the long axis direction of the shaped beam L32 (see FIG. 1) and the vertical direction in FIG. 2 corresponds to the short axis direction of the shaped beam L32.

Each pixel 221 is a modulation element including a fixed member 222 and a movable member 223. The fixed member 222 is a planar and substantially rectangular member fixed to the above-described substrate and provided with a sub-stantially circular opening at its center. The movable member 223 is a substantially circular member provided in the opening of the fixed member 222. On an upper surface of the fixed member 222 (i.e., a plane of this side in a direction perpendicular to this drawing paper in FIG. 2), provided is a fixed reflection surface. On an upper surface of the movable member 223, provided is a movable reflection surface. The movable member 223 is movable in the direction perpendicular to this drawing paper in FIG. 2.

In each pixel 221, by changing a relative position between the fixed member 222 and the movable member 223 in the direction perpendicular to this drawing paper in FIG. 2, a reflected light beam from the pixel 221 is switched between a zero-order beam (i.e., a specularly reflected light beam) and a non-zero-order diffracted beam. In other words, in the pixel 221, when the movable member 223 moves relatively to the fixed member 222, light modulation using a diffraction grating is performed. The zero-order beam emitted from the optical modulator 22 is guided to the scanning part 13 by the projection optical system 23 (see FIG. 1). Further, the non-zero-order diffracted beam (mainly a first-order diffracted beam) emitted from the optical modulator 22 is blocked by the projection optical system 23, not reaching the scanning part 13.

In the optical modulator 22, the reflected light beams from the M pixels 221 (hereinafter, also referred to as a "pixel row") aligned in the vertical direction of FIG. 2 are in the same diffraction state. Specifically, when the reflected light beam from one pixel 221 is a zero-order beam, the reflected light beams from all the other pixels 221 (i.e., M−1 pixels 221) in the pixel row including the above one pixel 221 are also the zero-order beams. Further, when the reflected light beam from one pixel 221 is a non-zero-order diffracted beam, the reflected light beams from all the other pixels 221 in the pixel row including the above one pixel 221 are also the non-zero-order diffracted beams. In other words, in the optical modulator 22, no modulation is performed on the shaped beam L32 in the short axis direction and modulation is performed on the shaped beam L32 in the long axis direction.

In the projection optical system 23, with respect to N pixel rows aligned in the long axis direction of the shaped beam L32 on the optical modulator 22, the reflected light beams from the M pixels 221 included in each pixel row are integrated and guided to the scanning part 13. It is thereby possible to increase the power density of the modulated beam L33 emitted from the scanning part 13 to the modeling material 91.

Further, in the optical modulator 22, the M pixels 221 in one pixel row (i.e., M modulation elements) can be regarded as one modulation element corresponding to one unit space. The optical modulator 22 functions as an optical modulator including N modulation elements aligned in the long axis direction of the shaped beam L32 on the optical modulator 22.

The projection optical system 23 shown in FIG. 1 guides the modulated beam L33 from the optical modulator 22 to the scanning part 13 while condensing the modulated beam L33. In other words, the scanning part 13 is a target object onto which the modulated beam L33 from the optical apparatus 12 is emitted. The modulated beam L33 is emitted onto an irradiated surface 134 of the scanning part 13. In FIG. 1, the irradiated surface 134 is represented by a solid circle (the same applies to FIG. 3 described later).

The scanning part 13 reflects the modulated beam L33 from the projection optical system 23 of the optical appa-ratus 12 and scans the modulated beam L33 on the modeling material 91 inside the modeling space 140 of the material feeding mechanism 14. The scanning part 13 includes a relay lens 131 and a galvano scanner 132. The galvano scanner 132 is a scanning mechanism including a galva-nometer mirror 133 and a galvano motor (not shown). The above-described irradiated surface 134 is an imaging plane on which the modulated beam L33 from the projection optical system 23 is imaged on the upstream side of the relay lens 131 in an irradiation direction of the optical apparatus (i.e., between the projection optical system 23 and the relay lens 131). In the scanning part 13, the irradiated surface 134 which is the imaging plane of the modulated beam L33 from the projection optical system 23 and a surface layer portion on the modeling material 91 are optically conjugated by the relay lens 131. Further, in the galvano scanner 132, the galvanometer mirror 133 is rotated by the galvano motor, to thereby change a traveling direction of the modulated beam L33 reflected by the galvanometer mirror 133. As a result, the modulated beam L33 emitted onto the modeling material 91 is scanned in a scan direction corresponding to the short axis direction of the modulated beam L33.

The material feeding mechanism 14 includes a modeling part 141 and a feeding part 142. The modeling part 141 includes a first cylinder 143 and a first piston 144. The first cylinder 143 is a tubular member extending in an up-and-down direction. The plan-view shape of an internal space of the first cylinder 143 is, for example, a substantially rect-angular shape. The first piston 144 is a substantially flat plate-like or substantially columnar member which is accommodated in the internal space of the first cylinder 143, and the plan-view shape thereof is almost the same as that of the internal space of the first cylinder 143. The first piston 144 is movable in the up-and-down direction inside the internal space of the first cylinder 143. In the modeling part 141, a three-dimensional space surrounded by an inner surface of the first cylinder 143 and an upper surface of the first piston 144 serves as the modeling space 140 in which the three-dimensional modeling is performed by using the modulated beam L33.

The feeding part 142 includes a second cylinder 145, a second piston 146, and a squeegee 147. The second cylinder 145 is a tubular member extending in the up-and-down direction and disposed adjacent to the side of the first cylinder 143. The plan-view shape of an internal space of the second cylinder 145 is, for example, a substantially rectangular shape. The second piston 146 is a substantially flat plate-like or substantially columnar member which is accommodated in the internal space of the second cylinder 145, and the plan-view shape thereof is almost the same as that of the internal space of the second cylinder 145. The second piston 146 is movable in the up-and-down direction inside the internal space of the second cylinder 145. In the feeding part 142, a three-dimensional space surrounded by an inner surface of the second cylinder 145 and an upper surface of the second piston 146 serves as a storage (pooling) space for storing the modeling material 91 which is to be fed to the modeling part 141. The squeegee 147 is a rodlike (e.g., substantially columnar) member extending in a horizontal direction across an upper opening of the second cylinder 145. The squeegee 147 is movable in the horizontal direction along an upper end surface of the second cylinder 145.

In the feeding part 142, the second piston 146 goes up by a predetermined distance and the modeling material 91 inside the second cylinder 145 is thereby lifted upward. Then, the squeegee 147 moves from on the second cylinder 145 to on the first cylinder 143, to thereby feed the modeling material 91 protruded upward from the upper end surface of the second cylinder 145 into the modeling space 140 of the modeling part 141. An upper surface of the modeling material 91 held inside the modeling space 140 is positioned at a predetermined height (for example, at the same height as that of an upper end surface of the first cylinder 143).

In the three-dimensional modeling apparatus 1, the above-described modulated beam L33 is scanned on the modeling material 91 inside the modeling space 140. With this scanning, in the surface layer portion of the modeling material 91 inside the modeling space 140, a portion irradiated with the modulated beam L33 is sintered, to thereby form a portion which corresponds to one layer among a plurality of layers laminated in the up-and-down direction, which are obtained by dividing the three-dimensional model. After the above-described scan of the modulated beam L33 on the modeling material 91 inside the modeling space 140 is finished, the first piston 144 goes down by the predetermined distance. After that, as described above, the modeling material 91 is fed into the modeling space 140 from the feeding part 142 and the modulated beam L33 is scanned thereon. In the three-dimensional modeling apparatus 1, by repeating the feed of the modeling material 91 into the modeling space 140 and the scan of the modulated beam L33 on the modeling material 91 inside the modeling space 140, the three-dimensional model is formed inside the modeling space 140.

Figure 3:
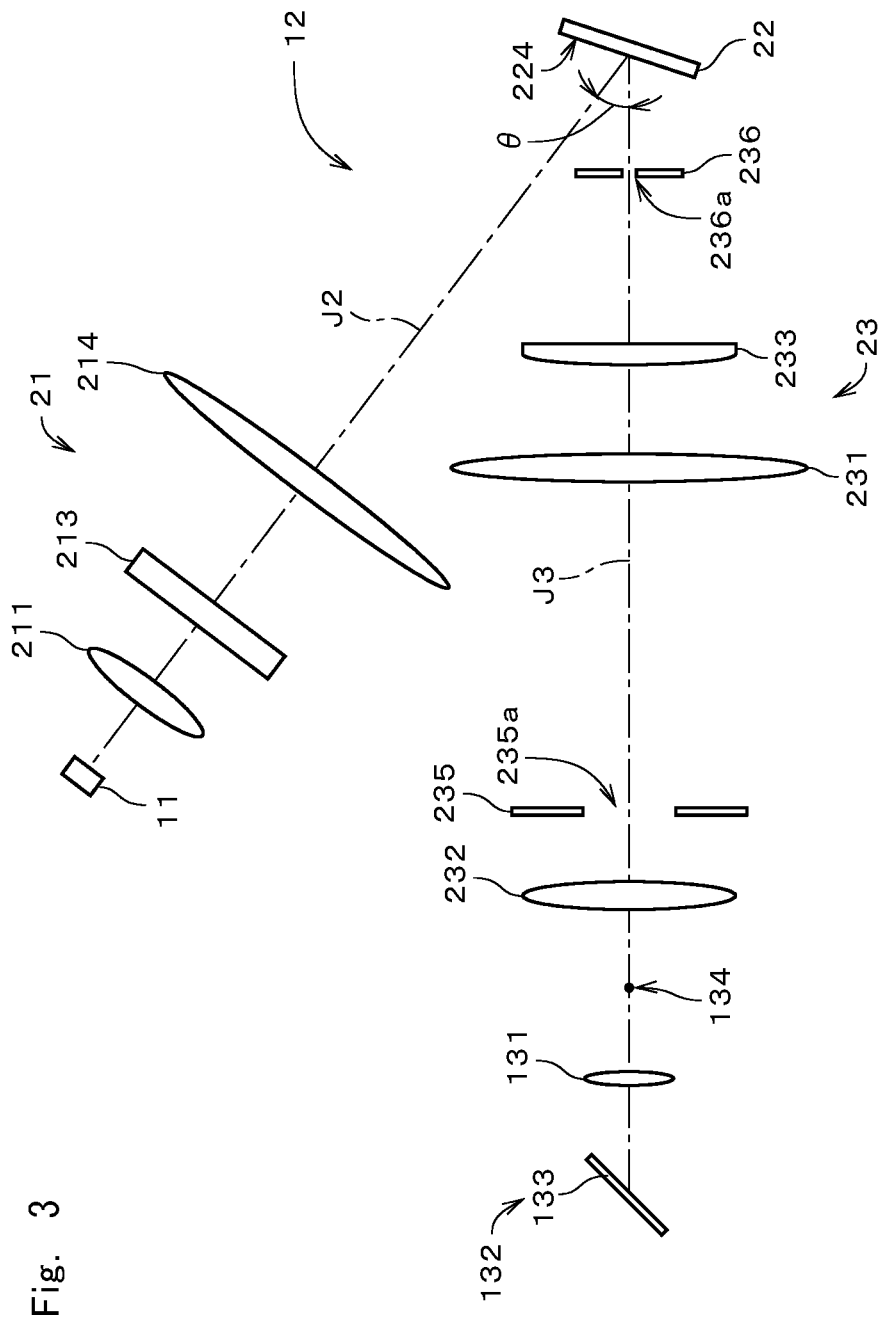
FIG. 3 is a view showing a configuration of an optical apparatus.
Figure 4:
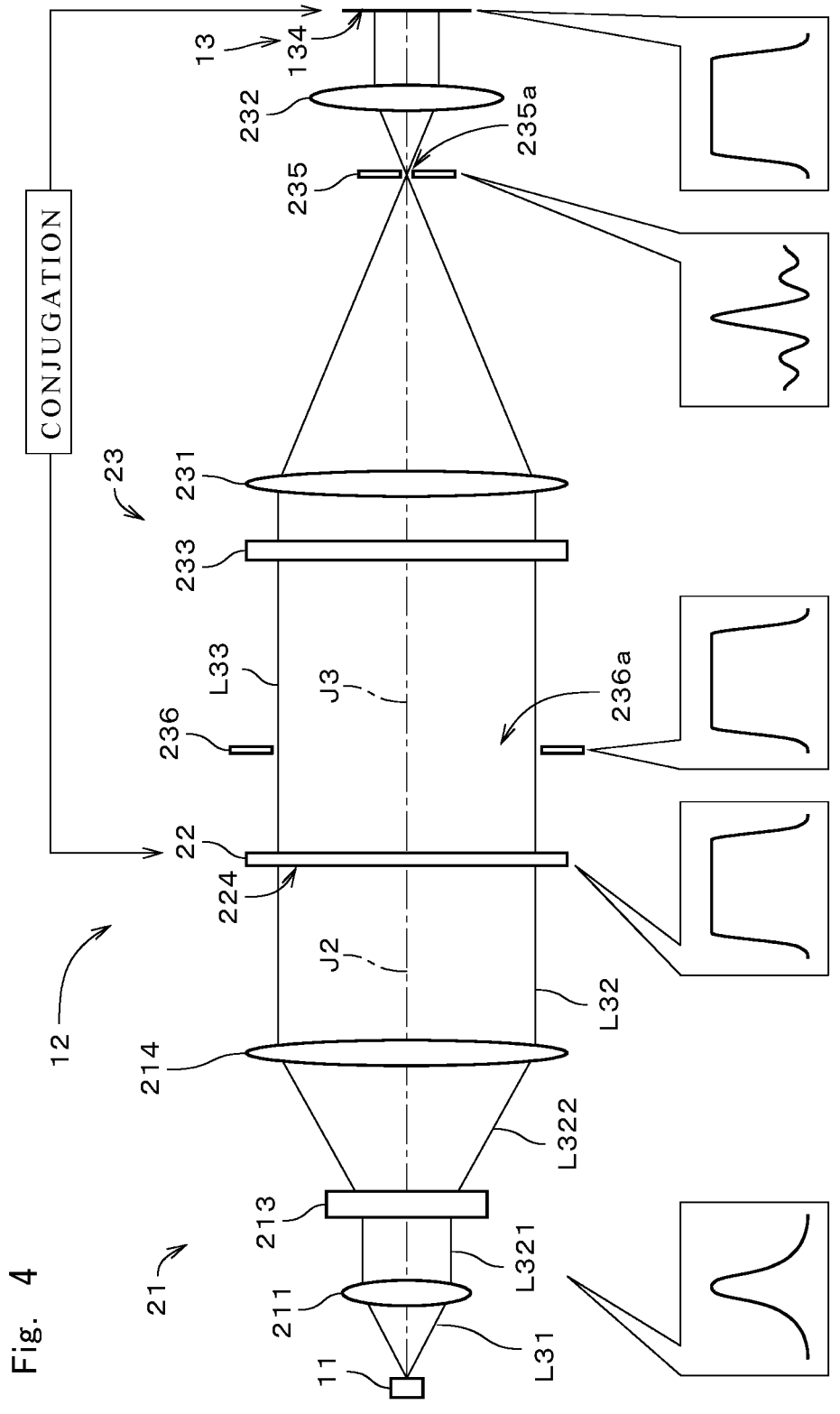
FIG. 4 is a view showing an optical path in the optical apparatus.
Figure 5:
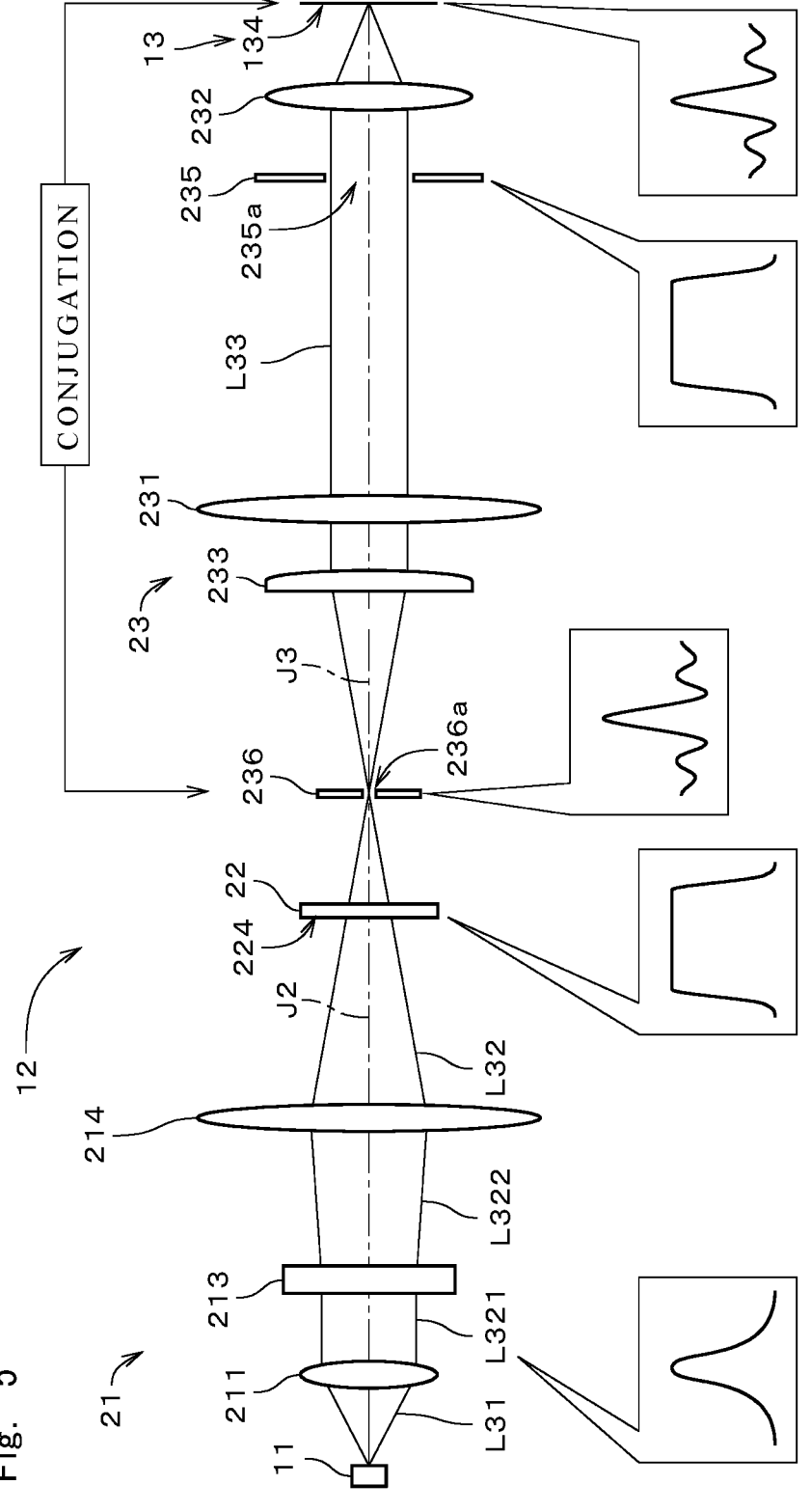
FIG. 5 is a view showing another optical path in the optical apparatus.

Next, with reference to FIGS. 3 to 5, a detailed configuration of the optical apparatus 12 will be described. FIG. 3 is a view showing a configuration of the optical apparatus 12. FIGS. 4 and 5 are views each schematically showing respective optical paths of the laser beam L31, the shaped beam, L32, and the modulated beam L33 in the optical apparatus 12. As shown in FIG. 3, in the optical apparatus 12 of the present preferred embodiment, the illumination optical system 21 and the projection optical system 23 are diagonally disposed (i.e., disposed so that an optical axis J2 of the illumination optical system 21 and an optical axis J3 of the projection optical system 23 may be intersected), but in FIGS. 4 and 5, for easy understanding of these figures, the illumination optical system 21 and the projection optical system 23 are shown, with the respective positions (the positional relation) changed, so that the optical axis J2 of the illumination optical system 21 and the optical axis J3 of the projection optical system 23 may be in a straight line.

In FIG. 4, the respective optical paths of the shaped beam L32 and the modulated beam L33 are shown so that the short axis direction of the shaped beam L32 and the modulated beam L33 may coincide with the direction perpendicular to this drawing paper. In FIG. 4, the long axis direction of the shaped beam L32 and the modulated beam L33 coincides with the up-and-down direction in this figure. Further, in FIG. 5, the respective optical paths of the shaped beam L32 and the modulated beam L33 are shown so that the long axis direction of the shaped beam L32 and the modulated beam L33 may coincide with the direction perpendicular to this drawing paper. In FIG. 5, the short axis direction of the shaped beam L32 and the modulated beam L33 coincides with the up-and-down direction in this figure.

The illumination optical system 21 of the optical apparatus 12 includes a collimator lens 211, a beam shaper 213, and an illumination optical element 214. The collimator lens 211 is, for example, a spherical lens. Further, in the exemplary case shown in FIGS. 3 to 5, the collimator lens 211 is one lens, but the collimator lens 211 may be constituted of two or more lenses. Furthermore, the collimator lens 211 is not limited to the spherical lens but may be a cylindrical lens or an aspherical lens.

The beam shaper 213 is a top-hat beam shaper which converts a distribution of light intensity (hereinafter, also referred to simply as an "intensity distribution") on a cross section of a collimated beam L321 (i.e., incident light) entering the beam shaper 213 with a Gaussian distribution, in each of the long axis direction and the short axis direction, from the Gaussian distribution into a top hat distribution in which the width of a region of the maximum intensity is wide (in other words, the top of the region is substantially flat). The beam shaper 213 is, for example, one optical element. In the present preferred embodiment, the beam shaper 213 is an aspherical concave lens, but any one of various optical elements other than the aspherical concave lens may be used as the beam shaper 213.

The illumination optical element 214 is, for example, one lens, and in the exemplary case shown in FIGS. 3 to 5, one spherical convex lens. In the following description, the illumination optical element 214 will be also referred to as a "convex lens 214". The convex lens 214 may be an aspherical convex lens. In the illumination optical system 21, the collimator lens 211, the beam shaper 213, and the convex lens 214 are arranged in this order in the traveling direction of the light from the laser light source 11 toward the optical modulator 22. Further, in the illumination optical system 21 exemplarily shown in FIGS. 3 to 5, between the beam shaper 213 and the optical modulator 22, no optical element other than the above-described single convex lens 214 is disposed. In other words, a beam L322 emitted from the beam shaper 213 is directly incident on the convex lens 214 without going through any other optical element, and is emitted as the shaped beam L32 from the convex lens 214. The shaped beam L32 emitted from the convex lens 214 is directly incident on the optical modulator 22 without going through any other optical element.

As described above, the illumination optical system 21 shapes the laser beam L31 emitted from the laser light source 11 into the shaped beam L32 and guides the shaped beam L32 to the optical modulator 22. The laser beam L31 emitted from the laser light source 11 goes through the collimator lens 211, the beam shaper 213, and the convex lens 214 in the illumination optical system 21 and is shaped into the shaped beam L32 having a desired shape in the short axis direction and the long axis direction, to be guided to the optical modulator 22. The shaped beam L32 refers to a light beam from being emitted from the illumination optical system 21 to being incident onto the optical modulator 22.

The intensity distribution on the cross section of the laser beam L31 before entering the illumination optical system 21 in each of the short axis direction and the long axis direction is a Gaussian distribution. Though there are some actual cases where this intensity distribution is not an exact Gaussian distribution but is a distribution having a form approximate to the Gaussian function, both the exact Gaussian distribution and the distribution close to the Gaussian distribution are collectively referred to each as a "Gaussian distribution" in the following description.

In the illumination optical system 21, the laser beam L31 goes through the collimator lens 211, to thereby become the collimated beam L321 which is parallel light in each of the long axis direction and the short axis direction, to be incident onto the beam shaper 213. The cross-sectional shape of the collimated beam L321 to be incident onto the beam shaper 213 is, for example, a substantially circular shape. The intensity distribution of the collimated beam L321 between the collimator lens 211 and the beam shaper 213 (i.e., before entering the beam shaper 213) is a Gaussian distribution in each of the long axis direction and the short axis direction as shown in a (the first) rectangle frame on the lower side of the optical path diagram in each of FIGS. 4 and 5.

The collimated beam L321 goes through the beam shaper 213, to thereby become the beam L322 which goes while spreading relatively wide in the long axis direction and spreading relatively small in the short axis direction, to be incident onto the convex lens 214. The beam shaper 213 diverges a group of rays in a region having high intensity at the center of the Gaussian distribution, among the incident light whose intensity distribution in the long axis direction is the Gaussian distribution, at a divergence angle larger than that of the group of rays in another region having low intensity on the outer periphery of the Gaussian distribution. In other words, the beam shaper 213 spreads the collimated beam L321 (i.e., the incident light) entering the beam shaper 213 at respective different divergence angles in the long axis direction and the short axis direction. After going through the beam shaper 213 and the convex lens 214, the intensity distribution of the collimated beam L321 in each of the long axis direction and the short axis direction is gradually shaped into an ideal top hat distribution (also referred to as a rectangular distribution) as the collimated beam L321 goes on the optical path. As shown in another (the second) rectangle frame on the lower side of the optical path diagram in each of FIGS. 4 and 5, the intensity distribution of the shaped beam L32 reaching the optical modulator 22 after going through the beam shaper 213 and the convex lens 214 is a top hat distribution in each of the long axis direction and the short axis direction.

The collimated beam L321 goes through the beam shaper 213 and the convex lens 214, to thereby become the shaped beam L32 which is parallel light in the long axis direction and convergent light in the short axis direction, to be incident onto the modulation surface 224 of the optical modulator 22. The cross-sectional shape of the shaped beam L32 entering the optical modulator 22 is a substantially rectangular shape which is long in the long axis direction, as described above. The length of the cross section of the shaped beam L32 entering the optical modulator 22 in the long axis direction is larger than the diameter of the substantially circular cross section of the collimated beam L321 entering the beam shaper 213. Further, the length of the cross section of the shaped beam L32 entering the optical modulator 22 in the short axis direction is smaller than the diameter of the cross section of the collimated beam L321 entering the beam shaper 213. Since a condensing position of the shaped beam L32 shaped by the convex lens 214 in the short axis direction is positioned on the opposite side of the illumination optical system 21 with the optical modulator 22 interposed therebetween (i.e., on the side of the projection optical system 23 of the optical modulator 22), the shaped beam L32 is incident onto the optical modulator 22 before reaching the condensing position on the short axis side.

The intensity distribution of the shaped beam L32 entering the optical modulator 22 (i.e., the intensity distribution of the shaped beam L32 on the modulation surface 224 of the optical modulator 22) is the top hat distribution in each of the long axis direction and the short axis direction, as shown in another (the second) rectangle frame on the lower side of the optical path diagram in each of FIGS. 4 and 5.

The shaped beam L32 entering the optical modulator 22 is modulated by the optical modulator 22 and incident onto the projection optical system 23 as the modulated beam L33. The modulated beam L33 emitted from the optical modulator 22 and incident onto the projection optical system 23 is parallel light in the long axis direction and convergent light in the short axis direction.

The projection optical system 23 includes a first projection optical element 231, a second projection optical element 232, a third projection optical element 233, a long axis side light shielding part 235, and a short axis side light shielding part 236. In the projection optical system 23, the short axis side light shielding part 236, the third projection optical element 233, the first projection optical element 231, the long axis side light shielding part 235, and the second projection optical element 232 are arranged in this order in the traveling direction of the modulated beam L33 from the optical modulator 22 toward the scanning part 13.

The short axis side light shielding part 236 is, for example, a flat plate-like member provided with an opening 236*a* having a substantially rectangular shape extending in parallel to the long axis direction at its center. A material of the short axis side light shielding part 236 is, for example, a metal such as stainless steel, copper, or the like, ceramics, or the like. The third projection optical element 233 is, for example, one lens, and in the exemplary case shown in FIGS. 3 to 5, one cylindrical convex lens. In the following description, the third projection optical element 233 will be also referred to as a "third lens 233". The third projection optical element 233 is positioned between the short axis side light shielding part 236 and the first projection optical element 231, as described above.

The first projection optical element 231 is, for example, one lens, and in the exemplary case shown in FIGS. 3 to 5, one spherical convex lens. In the following description, the first projection optical element 231 will be also referred to as a "first lens 231". The first projection optical element 231 has the same focus position both in the short axis direction and in the long axis direction. Further, the first projection optical element 231 may be, for example, an aspherical convex lens. The long axis side light shielding part 235 is, for example, a flat plate-like member provided with an opening 235a having a substantially rectangular shape extending in parallel to the short axis direction at its center. A material of the long axis side light shielding part 235 is, for example, a metal such as stainless steel, copper, or the like, ceramics, or the like. The second projection optical element 232 is, for example, one lens, and in the exemplary case shown in FIGS. 3 to 5, one spherical convex lens. In the following description, the second projection optical element 232 will be also referred to as a "second lens 232". The second projection optical element 232 may be, for example, an aspherical convex lens.

The short axis side light shielding part 236 is disposed at a condensing position of the modulated beam L33 emitted from the optical modulator 22 on the short axis side (i.e., a condensing position of the shaped beam L32 emitted from the illumination optical system 21 on the short axis side). Further, the short axis side light shielding part 236 may be disposed at a position slightly deviated from the condensing position in the traveling direction of the modulated beam L33 only if the short axis side light shielding part 236 is disposed substantially at the condensing position on the short axis side.

In the projection optical system 23 exemplarily shown in FIGS. 3 to 5, no other optical element such as a lens or the like is disposed between the optical modulator 22 and the short axis side light shielding part 236. In other words, the modulated beam L33 emitted from the optical modulator 22 is directly incident onto the short axis side light shielding part 236 without going through any other optical element. Further, the modulated beam L33 passing through the opening 236a of the short axis side light shielding part 236 is directly incident onto the third lens 233 without going through any other optical element.

The long axis side light shielding part 235 is disposed at a back focus position of the first lens 231. The back focus position of the first lens 231 coincides with a front focus position of the second lens 232. The position at which the long axis side light shielding part 235 is disposed is a condensing position of the modulated beam L33 passing through the third lens 233 and the first lens 231 on the long axis side. Further, the long axis side light shielding part 235 may be disposed at a position slightly deviated from the condensing position in the traveling direction of the modulated beam L33 only if the long axis side light shielding part 235 is disposed substantially at the condensing position on the long axis side.

In the projection optical system 23, the short axis side light shielding part 236 and the irradiated surface 134 of the scanning part 13 are optically conjugated with respect to the short axis direction. In the exemplary case shown in FIG. 5, the short axis side light shielding part 236 and the irradiated surface 134 of the scanning part 13 are optically conjugated with respect to the short axis direction by the third lens 233, the first lens 231, and the second lens 232. Further, in the projection optical system 23, the modulation surface 224 of the optical modulator 22 and the irradiated surface 134 of the scanning part 13 are optically conjugated with respect to the long axis direction. In the exemplary case shown in FIG. 5, the modulation surface 224 of the optical modulator 22 and the irradiated surface 134 of the scanning part 13 are optically conjugated with respect to the long axis direction by the first lens 231 and the second lens 232.

As described above, the projection optical system 23 guides the modulated beam L33 from the optical modulator 22 to the scanning part 13. Specifically, the modulated beam L33 which is the convergent light on the short axis side is condensed on the short axis side at the condensing position where the short axis side light shielding part 236 is disposed, and goes through the opening 236a of the short axis side light shielding part 236. In more detail, among the modulated beam L33 which is a reflected light beam reflected by the optical modulator 22, the zero-order beam and the non-zero-order diffracted beam on the long axis side pass through the opening 236a of the short axis side light shielding part 236. The cross-sectional shape of the modulated beam L33 passing through the opening 236a of the short axis side light shielding part 236 is a substantially straight linear shape or a substantially rectangular shape which is long in the long axis direction. The intensity distribution of the modulated beam L33 passing through the opening 236a of the short axis side light shielding part 236 is a substantial top hat distribution in the long axis direction and a sinc distribution in the short axis direction, as shown in still another (the third) rectangle frame on the lower side of the optical path diagram in each of FIGS. 4 and 5. Though there are some actual cases where the intensity distribution of the modulated beam L33 in the short axis direction is not an exact sinc distribution but is a distribution having a form approximate to the sinc function, both the exact sinc distribution and the distribution close to the sinc distribution are collectively referred to each as a "sinc distribution" in the following description.

Figure 6:
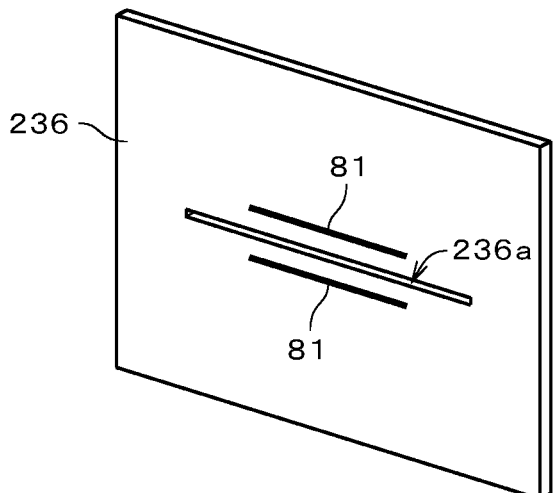
FIG. 6 is a perspective view showing a short axis side light shielding part.

On the other hand, the non-zero-order diffracted beam on the long axis side, among the modulated beam L33, is blocked by the short axis side light shielding part 236. The non-zero-order diffracted beam mainly refers to the first-order diffracted beam (i.e., (+1)st order diffracted beam and (−1)st order diffracted beam) and includes a second or more-order diffracted beam. As shown in FIG. 6, the non-zero-order diffracted beam on the short axis side is emitted onto an irradiation region 81 having a substantially straight linear shape or a substantially rectangular shape which is long in the long axis direction at portions on the upper and lower sides relative to the opening 236a of the short axis side light shielding part 236 (i.e., the both sides of the opening 236a in the short axis direction).

As shown in FIGS. 4 and 5, the cross section of the modulated beam L33 passing through the opening 236a of the short axis side light shielding part 236 is widened (becomes larger) in the short axis direction as it goes toward the traveling direction of the modulated beam L33, and the modulated beam L33 goes through the third lens 233 and the first lens 231 and thereby becomes parallel light in the short axis direction. In the long axis direction, the modulated beam L33 is not refracted when the modulated beam L33 goes through the third lens 233, and the modulated beam L33 is converged by passing through the first lens 231 and condensed at the back focus position of the first lens 231 (i.e., the front focus position of the second lens 232).

As described above, the long axis side light shielding part 235 is disposed at the condensing position of the modulated beam L33 from the first lens 231 on the long axis side (i.e., at the back focus position of the first lens 231). The modulated beam L33 passing through the first lens 231 goes through the opening 235a of the long axis side light shielding part 235. In more detail, among the modulated beam L33 which is the reflected light beam reflected by the optical modulator 22, the zero-order beam goes through the opening 235a of the long axis side light shielding part 235. The cross-sectional shape of the modulated beam L33 passing through the opening 235a of the long axis side light shielding part 235 is a substantially straight linear shape or a substantially rectangular shape which is long in the short axis direction. The intensity distribution of the modulated beam L33 passing through the opening 235a of the long axis side light shielding part 235 is a sinc distribution in the long axis direction and a top hat distribution in the short axis direction, as shown in yet another (the fourth) rectangle frame on the lower side of the optical path diagram in each of FIGS. 4 and 5.

Figure 7:
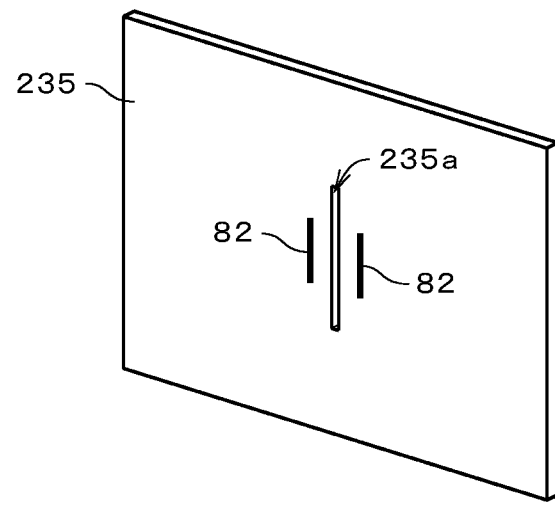
FIG. 7 is a perspective view showing a long axis side light shielding part.

On the other hand, the non-zero-order diffracted beam (mainly the first-order diffracted beam) on the long axis side, among the modulated beam L33, is blocked by the long axis side light shielding part 235. As shown in FIG. 7, the non-zero-order diffracted beam on the long axis side is emitted onto an irradiation region 82 having a substantially straight linear shape or a substantially rectangular shape extending in the short axis direction at portions on the left and right sides relative to the opening 235a of the long axis side light shielding part 235 (i.e., both sides of the opening 235a in the long axis direction).

As shown in FIGS. 4 and 5, the cross section of the modulated beam L33 passing through the opening 235a of the long axis side light shielding part 235 is widened (becomes larger) in the long axis direction as it goes toward the traveling direction of the modulated beam L33, and the modulated beam L33 goes through the second lens 232 and thereby becomes parallel light in the long axis direction. Further, the modulated beam L33 entering the second lens 232 as the parallel light in the short axis direction goes through the second lens 232, to be thereby converged in the short axis direction and condensed on the irradiated surface 134 of the scanning part 13 in the short axis direction, which is positioned at the back focus position of the second lens 232.

The cross-sectional shape of the modulated beam L33 on the irradiated surface 134 of the scanning part 13 is a substantially rectangular shape which is long in the long axis direction. The intensity distribution of the modulated beam L33 on the irradiated surface 134 of the scanning part 13 is a top hat distribution in the long axis direction and a sinc distribution in the short axis direction, as shown in a further (the fifth) rectangle frame on the lower side of the optical path diagram in each of FIGS. 4 and 5. Since the sinc distribution is a distribution having a main peak, substantially like the Gaussian distribution, the modulated beam L33 can be suitably condensed on the irradiated surface 134 of the scanning part 13.

In the three-dimensional modeling apparatus 1 shown in FIG. 1, as described above, the modulated beam L33 which is suitably condensed onto the irradiated surface 134 is scanned on the modeling material 91 inside the modeling space 140 by the scanning part 13. Then, by repeating the feed of the modeling material 91 into the modeling space 140 and the scan of the laser beam on the modeling material 91, the three-dimensional model is formed.

Next, exemplary specific sizes of the cross section of the shaped beam L32 and that of the modulated beam L33 in the optical apparatus 12, or the like, will be described. In the exemplary case, the wavelength λ of the laser beam L31 emitted from the laser light source 11 is 1.070 μm, and the diameter ($1/e^2$ width) of the substantially circular cross section of the collimated beam L321 entering the beam shaper 213 in the illumination optical system 21 is 5 mm. The paraxial focal length $f_x$ of the beam shaper 213 on the long axis side is −46 mm and the paraxial focal length $f_y$ thereof on the short axis side is −1250 mm. Further, the paraxial focal length $f_0$ of the convex lens 214 is 250 mm. The length (distance) $L_1$ between the beam shaper 213 and the convex lens 214 is about 204 mm and the length (distance) $L_2$ between the convex lens 214 and the modulation surface 224 of the optical modulator 22 is equal to $f_0$. In this case, an irradiation region of the shaped beam L32 on the modulation surface 224 has a substantially rectangular shape with the length of about 27 mm in the long axis direction and the length of about 1 mm in the short axis direction. As described above, the shaped beam L32 entering the optical modulator 22 is parallel light in the long axis direction and convergent light in the short axis direction.

The composite focal length between the beam shaper 213 and the convex lens 214 on the short axis side (i.e., the composite focal length between $f_y$ and $f_0$) is about 260 mm, and the condensing position of the shaped beam L32 entering the optical modulator 22 on the short axis side (i.e., the position where the short axis side light shielding part 236 is disposed) is a position away from the modulation surface 224 of the optical modulator 22 toward the back side (i.e., the side of the projection optical system 23) by about 52 mm. The numerical aperture NA forming the condensing position is 0.01, and the focus diameter (i.e., the dark ring diameter of the sinc function) of the modulated beam L33 at the condensing position in the short axis direction is about 130 μm.

In the projection optical system 23, the paraxial focal length $f_3$ of the third lens 233 is 158 mm, the paraxial focal length $f_1$ of the first lens 231 is 240 mm, and the paraxial focal length $f_2$ of the second lens 232 is 60 mm. The length (distance) $L_5$ between the third lens 233 and the first lens 231 is about 120 mm. The composite focal length between the third lens 233 and the first lens 231 on the short axis side (i.e., the composite focal length between $f_3$ and $f_1$) is about 136 mm. From the ratio between the composite focal length and the paraxial focal length $f_2$ of the second lens 232, the focus diameter (i.e., the dark ring diameter of the sinc function) of the modulated beam L33 on the irradiated surface 134 of the scanning part 13 in the short axis direction is about 57 μm which is about 0.44 times the focus diameter (about 130 μm) of the modulated beam L33 in the short axis direction at the above-described condensing position. Further, from the ratio between the paraxial focal length $f_1$ of the first lens 231 and the paraxial focal length $f_2$ of the second lens 232, the length of the modulated beam L33 on the irradiated surface 134 of the scanning part 13 in the long axis direction is about 6.74 mm which is about 0.25 times the length of the shaped beam L32 on the modulation surface 224 of the optical modulator 22 in the long axis direction.

The pitch of the pixels 221 in the optical modulator 22 in each of the long axis direction and the short axis direction is 25.5 μm, and the angle of the first-order diffracted beam with respect to the zero-order beam is about 42 mrad (milliradian). For this reason, in the short axis side light shielding part 236, the distance between the zero-order beam and the first-order diffracted beam in the short axis direction is about 2.2 mm. Further, in the long axis side light shielding part 235, the distance between the zero-order beam and the first-order diffracted beam in the long axis direction is about 10 mm.

As shown in FIG. 3, in the optical apparatus 12, the illumination optical system 21 is diagonally disposed with respect to the modulation surface 224 of the optical modulator 22, and the convex lens 214 which is a rear end portion of the illumination optical system 21 faces the modulation surface 224 of the optical modulator 22. The optical axis J2 of the illumination optical system 21 is inclined with respect to the normal direction of the modulation surface 224 of the optical modulator 22, and the shaped beam L32 emitted from the illumination optical system 21 toward the optical modulator 22 is diagonally incident onto the modulation surface 224 of the optical modulator 22 at a predetermined incident angle larger than 0°.

Further, in the optical apparatus 12, the projection optical system 23 is also diagonally disposed with respect to the modulation surface 224 of the optical modulator 22, and the short axis side light shielding part 236 which is a front end portion of the projection optical system 23 faces the modulation surface 224 of the optical modulator 22. The optical axis J3 of the projection optical system 23 is inclined with respect to the normal direction of the modulation surface 224 of the optical modulator 22, and the modulated beam L33 reflected while being modulated by the modulation surface 224 of the optical modulator 22 is incident onto the projection optical system 23 along the optical axis J3 of the projection optical system 23. Further, the reflection angle of the modulated beam L33 on the modulation surface 224 of the optical modulator 22 (which can be also regarded as the reflection angle of the shaped beam L32) is larger than 0°.

When an angle (acute angle) formed by the optical axis J2 of the illumination optical system 21 and the optical axis J3 of the projection optical system 23 is referred to as θ, as the angle θ becomes larger, the constituent elements such as the convex lens 214 or the like in the illumination optical system 21 and the constituent elements such as the short axis side light shielding part 236 or the like in the projection optical system 23 are made away from one another, and mechanical interference between the illumination optical system 21 and the projection optical system 23 is thereby suppressed. For this reason, the constituent elements such as the convex lens 214 or the like can be made closer to the optical modulator 22 in the direction of the optical axis J2 and the constituent elements such as the short axis side light shielding part 236 or the like can be made closer to the optical modulator 22 in the direction of the optical axis J3. It is thereby possible to downsize the optical apparatus 12 in the left-and-right direction in FIG. 3. On the other hand, as the angle θ becomes larger, the size of the optical apparatus 12 in the up-and-down direction is increased.

Further, as the angle θ becomes smaller, since the illumination optical system 21 and the projection optical system 23 become closer to each other in the up-and-down direction in FIG. 3, it is possible to downsize the optical apparatus 12 in the up-and-down direction. On the other hand, as the angle θ becomes smaller, the constituent elements such as the convex lens 214 or the like in the illumination optical system 21 and the constituent elements such as the short axis side light shielding part 236 or the like in the projection optical system 23 become closer to one another in the up-and-down direction in FIG. 3. Therefore, in order to suppress the mechanical interference between the illumination optical system 21 and the projection optical system 23, it is necessary to make the constituent elements such as the convex lens 214 or the like away from the optical modulator 22 in the direction of the optical axis J2 and make the constituent elements such as the short axis side light shielding part 236 or the like away from the optical modulator 22 in the direction of the optical axis J3. For this reason, the size of the optical apparatus 12 in the left-and-right direction is increased.

In order to achieve both downsizing of the optical apparatus 12 in the left-and-right direction in FIG. 3 and downsizing of the optical apparatus 12 in the up-and-down direction, the angle θ formed by the optical axis J2 of the illumination optical system 21 and the optical axis J3 of the projection optical system 23 is preferably not smaller than 10° and not larger than 30°, and more preferably not smaller than 10° and not larger than 20°.

As described above, the optical apparatus 12 is an apparatus for emitting the modulated beam L33 onto the target object (the scanning part 13 in the above-described exemplary case). The optical apparatus 12 includes the illumination optical system 21, the optical modulator 22, and the projection optical system 23. The illumination optical system 21 shapes the laser beam L31 into the shaped beam L32 which is long in the long axis direction. The optical modulator 22 modulates the shaped beam L32 into the modulated beam L33. The projection optical system 23 guides the modulated beam L33 onto the irradiated surface 134 of the target object. The illumination optical system 21 includes the beam shaper 213 and the illumination optical element 214 (the convex lens 214 in the above-described exemplary case). The illumination optical system 21 is configured to convert the intensity distribution of the incident light in the long axis direction from the Gaussian distribution, to thereby bring the intensity distribution of the shaped beam L32 on the modulation surface 224 of the optical modulator 22 in the long axis direction into the top hat distribution. Further, the illumination optical system 21 is configured to guide the incident light to the optical modulator 22 as the parallel light in the long axis direction and as the convergent light in the short axis direction. The optical modulator 22 includes a plurality of modulation elements (the pixels 221 in the above-described exemplary case) which are two-dimensionally arranged, and performs modulation in the long axis direction and dose not perform modulation in the short axis direction.

The projection optical system 23 includes the short axis side light shielding part 236, the first projection optical element 231 (the first lens 231 in the above-described exemplary case), the long axis side light shielding part 235, and the second projection optical element 232 (the second lens 232 in the above-described exemplary case). The short axis side light shielding part 236 is disposed at the condensing position of the modulated beam L33 on the short axis side, which is emitted from the optical modulator 22 and is the convergent light on the short axis side, and blocks the non-zero-order diffracted beam of the modulated beam L33 on the short axis side. The first projection optical element 231 converges the modulated beam L33 passing through the short axis side light shielding part 236, in the long axis direction. The long axis side light shielding part 235 is disposed at the condensing position of the modulated beam L33 on the long axis side, which is emitted from the first projection optical element 231, and blocks the non-zero-order diffracted beam of the modulated beam L33 on the long axis side. The second projection optical element 232 converges the modulated beam L33 passing through the long axis side light shielding part 235, in the short axis direction, and condenses the modulated beam L33 on the irradiated surface 134. The modulation surface 224 and the irradiated surface 134 are optically conjugated with respect to the long axis direction by the projection optical system 23.

Thus, in the optical apparatus 12, by bring the intensity distribution of the laser beam L31 in the long axis direction into the top hat distribution by the illumination optical system 21 including the beam shaper 213 and the illumination optical element 214, it is possible to increase the amount of light to be inputted to the optical modulator 22 while reducing the maximum power density of the shaped beam L32 to be incident onto the optical modulator 22. Further, in the optical apparatus 12, since it is not necessary to provide any optical element for condensing the modulated beam L33 after being modulated by the optical modulator 22 toward the short axis side light shielding part 236 in the projection optical system 23, it is possible to reduce the number of optical elements such as lenses or the like constituting the projection optical system 23. In other words, in the optical apparatus 12, it is possible to increase the amount of light to be inputted to the optical modulator 22 while simplifying the structure of the projection optical system 23. Further, in the optical apparatus 12, since the modulation surface 224 of the optical modulator 22 and the irradiated surface 134 of the target object are optically conjugated with respect to the long axis direction, it is possible to reflect the modulation of the light on the modulation surface 224, onto the irradiated surface 134 with high accuracy.

As described above, preferably, the projection optical system 23 further includes the third projection optical element 233 positioned between the short axis side light shielding part 236 and the first projection optical element 231. The modulated beam L33 passing through the short axis side light shielding part 236 is made parallel light in the short axis direction by the third projection optical element 233 and the first projection optical element 231. The first projection optical element 231 has the same focus position in the short axis direction as that in the long axis direction. Then, it is preferable that the short axis side light shielding part 236 and the irradiated surface 134 of the target object are optically conjugated with respect to the short axis direction by the projection optical system 23. It is thereby possible to suitably condense the modulated beam L33 on the irradiated surface 134 of the target object in the short axis direction. As a result, it is possible to suitably increase the power density of the modulated beam L33 to be emitted onto the target object.

As described above, it is preferable that the illumination optical system 21 should convert the intensity distribution of the laser beam L31 in the short axis direction from the Gaussian distribution, to thereby bring the intensity distribution of the shaped beam L32 on the modulation surface 224 in the short axis direction into the top hat distribution. It is thereby possible to increase the amount of light to be inputted to the optical modulator 22 while reducing the maximum power density of the shaped beam L32 to be incident onto the optical modulator 22. In other words, it is possible to further increase the amount of light to be inputted to the optical modulator 22.

As described above, it is preferable that the illumination optical element 214 should be one lens (the convex lens 214 in the above-described exemplary case). Further, it is preferable that in the illumination optical system 21, no optical element other than the one lens is disposed between the beam shaper 213 and the optical modulator 22. It is thereby possible to simplify the structure of the illumination optical system 21. As a result, it is possible to increase the degree of freedom in the arrangement of the illumination optical system 21 and downsize the optical apparatus 12.

As described above, it is preferable that the modulated beam L33 emitted from the optical modulator 22 should be directly incident onto the short axis side light shielding part 236 without going through any other optical element. It is thereby possible to further simplify the structure of the projection optical system 23. As a result, it is possible to increase the degree of freedom in the arrangement of the projection optical system 23 and downsize the optical apparatus 12.

As described above, it is preferable that the optical modulator 22 should be a PLV. Having high power resistance performance, the PLV is especially suitable for the optical modulator 22 which is required to increase the amount of light to be inputted thereto.

As described above, it is preferable that the beam shaper 213 should be one optical element for spreading the incident light at respective different divergence angles in the long axis direction and the short axis direction. It is thereby possible to generate the shaped beam L32 having a cross-sectional shape which is long in the long axis direction while simplifying the structure of the illumination optical system 21. As a result, it is possible to further downsize the optical apparatus 12. Further, the beam shaper 213 may converge the incident light in the short axis direction.

It is preferable that in the optical apparatus 12, the shaped beam L32 outgoing from the illumination optical system 21 should be diagonally incident onto the modulation surface 224 at a predetermined incident angle and the modulated beam L33 reflected while being modulated by the modulation surface 224 should be incident onto the projection optical system 23. As described above, in the optical apparatus 12, since the structure of the projection optical system 23 is simplified, it is possible to downsize the optical apparatus 12 having the above-described configuration in which the illumination optical system 21 and the projection optical system 23 are aligned at a position to face the modulation surface 224 in a direction where the illumination optical system 21 and the projection optical system 23 are aligned (i.e., the up-and-down direction in FIGS. 1 and 3).

The three-dimensional modeling apparatus 1 includes the optical apparatus 12, the laser light source 11, and the scanning part 13 described above. The laser light source 11 emits the laser beam L31 to the optical apparatus 12. The scanning part 13 is the above-described target object to be irradiated with the modulated beam L33 from the optical apparatus 12 and scans the modulated beam L33 on the modeling material. Since the power density of the modulated beam L33 to be emitted onto the target object (i.e., the scanning part 13) can be suitably increased in the optical apparatus 12 as described above, the power density of the modulated beam L33 to be emitted onto the modeling material 91 can be also suitably increased in the three-dimensional modeling apparatus 1. As a result, it is possible to increase the modeling speed of a modeled object in the three-dimensional modeling apparatus 1 and increase the productivity. Further, in the optical apparatus 12, as described above, since the structure of the projection optical system 23 can be simplified to thereby downsize the optical apparatus 12, it is possible to also downsize the three-dimensional modeling apparatus 1.

As described above, it is preferable that the scanning part 13 should include the galvanometer mirror 133 which rotates to change the traveling direction of the modulated beam L33. It is thereby possible to perform scanning of the modulated beam L33 from the optical apparatus 12 at high speed with high accuracy.

In the three-dimensional modeling apparatus 1, as described above, it is preferable that the scan direction of the modulated beam L33 by the scanning part 13 should be a direction corresponding to the short axis direction of the modulated beam L33. Since the intensity distribution of the modulated beam L33 on the modeling material 91 in the short axis direction is the sinc distribution, there is a bright ring around the focal point and a region on the front side in the scan direction (i.e., short axis direction) relative to the focal point is preheated by the bright ring. For this reason, when the preheated region is scanned with the modulated beam L33, it is possible to reduce the heating time of this region. As a result, it is possible to further increase the productivity of the three-dimensional modeling apparatus 1.

In the optical apparatus 12 and the three-dimensional modeling apparatus 1 described above, various modifications can be made.

For example, the arrangement of the illumination optical system 21, the optical modulator 22, and the projection optical system 23 is not limited to the one shown in FIGS. 1 and 3 but may be changed in various ways. For example, the shaped beam L32 emitted from the illumination optical system 21 does not necessarily need to be diagonally incident onto the modulation surface 224 of the optical modulator 22 but may be substantially perpendicularly incident thereon.

The optical modulator 22 is not necessarily limited to the LPLV but may be a PLV other than the LPLV. Further, as the optical modulator 22, any one other than the PLV, such as a GLV (Grating Light Valve) (registered trademark), a DMD (Digital Micromirror Device), or the like may be also used.

The divergence angles of the incident light by the beam shaper 213 in the long axis direction and the short axis direction do not necessarily need to be different from each other but may be the same in the long axis direction and the short axis direction. Further, the beam shaper 213 does not necessarily need to be constituted of only one optical element but may be constituted of a plurality of optical elements. The beam shaper 213 is not necessarily limited to the aspherical concave lens but may be, for example, an ROE (Refractive Optical Element) such as a freeform lens or the like, or may be a DOE (Diffractive Optical Element). In the beam shaper 213, the intensity distribution of the laser beam L31 in the short axis direction does not necessarily need to be converted into the top hat distribution.

In the illumination optical system 21, the illumination optical element 214 does not necessarily need to be the convex lens but may be any other optical element. Further, the illumination optical element 214 does not necessarily need to be constituted of only one optical element but may be constituted of a plurality of optical elements. In the illumination optical system 21, between the beam shaper 213 and the optical modulator 22, any other optical element may be disposed additionally to the illumination optical element 214.

In the projection optical system 23, an optical element may be disposed between the optical modulator 22 and the short axis side light shielding part 236. In this case, the modulated beam L33 emitted from the optical modulator 22 is incident onto the short axis side light shielding part 236 through this optical element.

In the projection optical system 23, each of the first projection optical element 231, the second projection optical element 232, and the third projection optical element 233 is not necessarily limited to a single lens but, for example, may be constituted of two or more optical elements. Further, in the projection optical system 23, any optical element other than the first projection optical element 231, the second projection optical element 232, or the third projection optical element 233 may be added. The material, shape, and structure of each of the long axis side light shielding part 235 and the short axis side light shielding part 236 in the projection optical system 23 are not necessarily limited to the above-described ones but may be changed in various ways.

In the optical apparatus 12, the short axis side light shielding part 236 and the irradiated surface 134 may not be optically conjugated with respect to the short axis direction. For example, the irradiated surface 134 may be slightly deviated from a position at which the irradiated surface 134 and the short axis side light shielding part 236 are optically conjugated with respect to the short axis direction.

In the scanning part 13 of the three-dimensional modeling apparatus 1, instead of the galvano scanner 132, a scanning mechanism having a different constituent element such as a polygon laser scanner or the like may be provided. Alternatively, the scanning part 13 is not limited to the one for changing the traveling direction of the modulated beam L33 from the projection optical system 23 but may be, for example, a moving mechanism such as a linear motor or the like for moving the modeling part 141 in the horizontal direction, which holds the modeling material 91 with the irradiation position of the modulated beam L33 fixed.

The optical apparatus 12 does not necessarily need to be provided in the three-dimensional modeling apparatus 1 but may be used in, for example, a laser beam machine such as a laser marking apparatus or the like.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Three-dimensional modeling apparatus
11 Laser light source
12 Optical apparatus
13 Scanning part
21 Illumination optical system
22 Optical modulator
23 Projection optical system
91 Modeling material
133 Galvanometer mirror
134 Irradiated surface
213 Beam shaper
214 Illumination optical element
221 Pixel (modulation element)
224 Modulation surface
231 First projection optical element
232 Second projection optical element
233 Third projection optical element
235 Long axis side light shielding part
236 Short axis side light shielding part
L31 Laser beam
L32 Shaped beam
L33 Modulated beam

The invention claimed is:

1. An optical apparatus for emitting a modulated beam onto a target object, comprising:

an illumination optical system for shaping a laser beam into a shaped beam which is long in a long axis direction;

an optical modulator for modulating said shaped beam into a modulated beam; and a projection optical system for guiding said modulated beam onto an irradiated surface of a target object, wherein said illumination optical system comprises:

a beam shaper; and an illumination optical element, said illumination optical system is configured to convert an intensity distribution of incident light in said long axis direction from a Gaussian distribution, to thereby bring an intensity distribution of said shaped beam on a modulation surface of said optical modulator in said long axis direction into a top hat distribution, and to guide said incident light to said optical modulator as parallel light in said long axis direction and as convergent light in said short axis direction, said optical modulator comprises a plurality of modulation elements which are two-dimensionally arranged, and performs modulation in said long axis direction and dose not perform modulation in said short axis direction, said projection optical system comprises:

a short axis side light shielding part disposed at a condensing position on a short axis side of said modulated beam which is emitted from said optical modulator and is convergent light on a short axis side, for blocking a non-zero-order diffracted beam on said short axis side of said modulated beam;

a first projection optical element for converging said modulated beam passing through said short axis side light shielding part in said long axis direction;

a long axis side light shielding part disposed at a condensing position on a long axis side of said modulated beam from said first projection optical element, for blocking a non-zero-order diffracted beam on said long axis side of said modulated beam; and a second projection optical element for converging said modulated beam passing through said long axis side light shielding part in said short axis direction and condensing said modulated beam on said irradiated surface, and said modulation surface and said irradiated surface are optically conjugated with respect to said long axis direction by said projection optical system.

2. The optical apparatus according to claim 1, wherein said projection optical system further comprises a third projection optical element positioned between said short axis side light shielding part and said first projection optical element, said modulated beam passing through said short axis side light shielding part is made parallel light in said short axis direction by said third projection optical element and said first projection optical element, said first projection optical element has the same focus position both in said short axis direction and in said long axis direction, and said short axis side light shielding part and said irradiated surface are optically conjugated with respect to said short axis direction by said projection optical system.

3. The optical apparatus according to claim 1, wherein said illumination optical system converts an intensity distribution of said laser beam in said short axis direction from a Gaussian distribution, to thereby also bring an intensity distribution of said shaped beam on said modulation surface in said short axis direction into a top hat distribution.

4. The optical apparatus according to claim 1, wherein said illumination optical element is one lens, and no optical element other than said one lens is disposed between said beam shaper and said optical modulator in said illumination optical system.

5. The optical apparatus according to claim 1, wherein said modulated beam emitted from said optical modulator is directly incident onto said short axis side light shielding part without going through any other optical element.

6. The optical apparatus according to claim 1, wherein said optical modulator is a PLV (Planar Light Valve).

7. The optical apparatus according to claim 1, wherein said beam shaper is one optical element for spreading incident light at respective different divergence angles in said long axis direction and said short axis direction.

8. The optical apparatus according to claim 1, wherein said shaped beam outgoing from said illumination optical system is diagonally incident onto said modulation surface at a predetermined incident angle, and said modulated beam reflected by said modulation surface while being modulated is incident onto said projection optical system.

9. A three-dimensional modeling apparatus, comprising:

said optical apparatus according to claim 1;

a laser light source for emitting said laser beam to said optical apparatus; and a scanning part which is said target object irradiated with said modulated beam from said optical apparatus and scans said modulated beam on a modeling material.

10. The three-dimensional modeling apparatus according to claim 9, wherein said scanning part comprises a galvanometer mirror which rotates to change a traveling direction of said modulated beam.

* * * * *